United States Patent
Blowers et al.

(10) Patent No.: US 8,732,100 B2
(45) Date of Patent: May 20, 2014

(54) METHOD AND APPARATUS FOR EVENT DETECTION PERMITTING PER EVENT ADJUSTMENT OF FALSE ALARM RATE

(75) Inventors: Misty Blowers, Minoa, NY (US); Chad Salisbury, Sauquoit, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 300 days.

(21) Appl. No.: 13/506,401

(22) Filed: Mar. 22, 2012

(65) Prior Publication Data

US 2012/0271782 A1     Oct. 25, 2012

Related U.S. Application Data

(60) Provisional application No. 61/517,857, filed on Apr. 20, 2011.

(51) Int. Cl.
G06F 15/18 (2006.01)
G06F 11/00 (2006.01)
G05B 23/00 (2006.01)
G06N 3/04 (2006.01)

(52) U.S. Cl.
CPC .............. *G05B 23/00* (2013.01); *G06N 3/0472* (2013.01)
USPC ............................................. 706/12; 714/100

(58) Field of Classification Search
CPC .............................. G05B 23/00; G06N 3/0472
See application file for complete search history.

(56) References Cited

U.S. PATENT DOCUMENTS

| | | | |
|---|---|---|---|
| 6,594,620 B1 * | 7/2003 | Qin et al. | 702/185 |
| 6,795,935 B1 * | 9/2004 | Unkle et al. | 714/37 |
| 7,246,290 B1 * | 7/2007 | Green et al. | 714/737 |
| 2008/0215576 A1 * | 9/2008 | Zhao et al. | 707/5 |

* cited by examiner

*Primary Examiner* — Alan Chen
(74) *Attorney, Agent, or Firm* — Joseph A. Mancini

(57) ABSTRACT

Method and apparatus for object or event of interest detection which minimizes the level of false alarms and maximizes the level of detections as defined on a per event or object basis by the analyst. The invention allows for the minimization of false alarms for objects or events of interest which have a close resemblance to all other objects or events mapped to the same multidimensional feature space, and allows for the per event or per object adjustment on false alarms for objects or events of higher interest.

14 Claims, 3 Drawing Sheets

| Column | T-Relative Strength | Mean Difference | Variance Difference |
|---|---|---|---|
| HYDRAPULPER FEED CONVEYOR | 11 | 2.3891118646544488 | 120.37207281924623 |
| HYDRAPULPER | 81 | 2.9819246758910114 | 132.02250225083958 |
| PRI CRS SCRN FEED | 11 | 0.4306709804657399 | 41.52794276441052 |
| PRI CRS SCRN FEED | 110 | 3.0109196550502296 | 50.70058904179217 |
| PRI CRS SCRN FEED | 236 | 0.3802934702663094 | 4.72692286972818? |
| PRI COARSE SCREEN PD | 78 | 1.5809650808925S | 12.162083971207093 |
| PRI COARSE SCREEN FEED | 0 | 3.9003423236785104B | 24.177144758568968 |
| PRI COARSE SCREEN FEED | 22 | 1.852920961103123A | 129.4236907600762? |
| PRI COARSE SCREEN FEED | 0 | 0.0 | 0.0 |
| PRI COARSE SCREEN ACCPET | 38 | 1.0633253900983A2 | 95.63831394213592 |
| PRI COARSE SCREEN ACCPET | 115 | 1.775528347026011 | 74.98774286926893 |
| PRI COARSE SCREEN ACCPET | 26 | 2.664375294486499 | 177.0010573758982? |
| PRI COARSE SCREEN ACCPET | 13 | 0.914968311130666 | 32.65288013470978 |

Between January ▼ 1 , 2008 at 00 : 00

And December ▼ 31 , 2008 at 23 : 55

Load Selected Data Into Clusterer

Figure 3

METHOD AND APPARATUS FOR EVENT DETECTION PERMITTING PER EVENT ADJUSTMENT OF FALSE ALARM RATE

PRIORITY CLAIM UNDER 35 U.S.C. §119(e)

This patent application claims the priority benefit of the filing date of a provisional application Ser. No. 61/517,857, filed in the United States Patent and Trademark Office on Apr. 20, 2011 and now incorporated herein by reference.

STATEMENT OF GOVERNMENT INTEREST

The invention described herein may be manufactured and used by or for the Government for governmental purposes without the payment of any royalty thereon.

BACKGROUND OF THE INVENTION

1. Technical Field of the Invention

This invention relates generally to the field of event or object detection. More specifically, the present invention relates to methods for event or object detection where the false alarm rate of detection can be refined through both machine learning and operator feedback.

2. Background

It is generally desired to reduce the amount of downtime in industrial processes. Downtime is caused by a number of factors and it is desirable to identify those components of a particular process that can be indicators of an upcoming failure. These indicators can then be detected by an automated computer system in order to provide a warning of an event. This approach can be extended to generalized detection of an object of interest.

Industrial processes can be dynamic environments. Variability in operating conditions in industrial processes has the potential to cause loss of production, damaged equipment, and could create an unsafe operating environment. When an upset condition occurs, the operators are inundated with huge amounts of data to be processed in a short amount of time. Automated computer systems which monitor and study processes during production can be valuable tools for the operators. Such systems could not only advise the operators of the various actions to be taken to keep the processes running in a stable fashion, they could also minimize the probability of downtimes.

In order to manage the dynamics of an industrial process, complex process control systems have been widely established. In a paper mill, for example, the number of I/O connections in typical mills can vary from 30,000 to more than 100,000. The industry is constantly searching for ways to manage these complex systems in better ways. The first issue to be addressed is in how to handle the huge amount of raw sensor data available within the system. High-dimensional data analysis and reduction are important techniques used to help reduce the dimensionality of the huge amount of raw data (1). From here, various process monitoring and simulation methods exist. These methods are typically either data driven, analytical, or knowledge based (2). Sometimes, combining existing methods proves to be beneficial.

Various techniques from modeling and simulation attempt to characterize the process behavior and are used to develop models for predicting how the system will respond during system upsets or equipment changes. Some research has shown that even small fluctuations in process signals may be precursors to predicting system upsets (2). It is important for an automated system to be able to distinguish the inherent variability of the process from the precursors to system upsets or faults. One of the biggest challenges in a system which has a great deal of inherent variability is to identify when, where, and how much change is significant. If a system cannot correctly identify the precursors to a failure state, the operators may be inundated with false alarms and lose faith in the reliability of the automated system.

For most minor process fluctuations the process controllers (Proportional, Integral, and Derivative (PID)) and model predictive controllers are designed to maintain satisfactory operations by compensating for the effects of disturbances and changes occurring in the process. However, there are some changes in the process which cause disturbances which the controllers cannot adequately handle. These are the disturbances that may lead to faults (3) (4).

Isermann (5) wrote a review article on fault detection based on modeling and system estimation. He claims that with a good model of the process, we can improve our ability to indicate when process faults are likely. As with other similar process models, his system compared current process signatures and outputs with those from the model. When values above or below some threshold were detected, they were labeled as fault indicators. The problem is that when the system is so complex and dynamic, models like Isermann's are often limited. Systems that are currently available rarely try to evaluate the process, for example, the process performed in a paper mill, from the raw material through final product. More often, they try to break the process up into its subprocesses and in doing so, some dependencies may be overlooked. This is especially important when considering the amount of recirculated material within the system. Due to the interdependencies of the various processes in the system, along with the recirculation of material, tracing the time lags in the system also becomes an enormously challenging problem.

Some research efforts have looked at inducing a model using time-series analysis. One classical approach is to build an autoregressive moving average (ARMA) (6). Often associated with the ARMA approach is the cumulative sum (CUSUM) of the residuals method to identify faults. Unfortunately, these methods are limited when the process has many modes of operation, or grades, which are produced in a single process (7).

Research efforts, by Kim et al., have focused on monitoring various process signatures in real-time and incorporating these with equipment maintenance history data and in-line measurements of product quality (8). Combining information in this way helped build stronger process models.

To add to the overall difficulty of dealing with a complex system, uncertainty exists in the sensory measurements, there is cooperation among certain sensors, and there are competing objectives among other sensors. Basir et al. (3) presented a probabilistic approach for modeling the uncertainty and cooperation between sensors. Their research shows how measures of variation can be used to capture both the quality of sensory data and the interdependent relationships that might exist between the different sensors. Some methods presented in this work use information about the variance and standard deviation of each sensor to capture similar relationships in the process.

Both within the paper industry, as well as in other manufacturing environments, various research efforts (9) (10) have explored using neural networks to model the process dynamics. Some research has demonstrated the ability of time-delay neural networks to capture the dynamics of the process. Others (11) (8) have explored the possibility of knowledge based neural network models.

The limitation in using neural network models is that the model may become overtrained for a given set of training inputs. When a neural network becomes overtrained, it has modeled the training set too closely and cannot correctly generalize to other inputs. Therefore, when process conditions change, retraining of the network model may be necessary. While such limitations need to be accounted for, neural network models can still be a very useful tool. This is especially evident when they are paired with other methods, like sensitivity analysis.

A sensitivity analysis indicates which input variables are considered most important by a particular neural network. Sensitivity analysis can give important insights into the usefulness of individual variables (12). In processes where more than one product or grade of product is produced on the same process equipment, there becomes another challenge in dealing with different modes of operation. For this reason, clustering algorithms are useful. Clustering algorithms have the advantage of discovering multiple clusters of operating modes, allowing for the system to create multiple functions to describe modes of good or bad process conditions.

THE PRIOR ART

Other attempts at achieving event or object detection have taken place.

U.S. Pat. No. 7,587,374 to Lynch et al provides a method of training a mean-field Bayesian data reduction algorithm (BDRA) based classifier which includes using an initial training for determining the best number of levels. The Mean-Field BDRA is then retrained for each point in a target data set and training errors are calculated for each training operation. Cluster candidates are identified as those with multiple points having a common training error. Utilizing these cluster candidates and previously identified clusters as the identified target data, the clusters can be confirmed by comparing a newly calculated training error with the previously calculated common training error for the cluster. The method can be repeated until all cluster candidates are identified and tested. Essentially, the method in Lynch adds clusters until the error is acceptably low.

U.S. Pat. No. 7,177,863 to Charpiot et al provides a system and associated method for tuning a data clustering program to a clustering task; determine at least one internal parameter of a data clustering program. The determination of one or more of the internal parameters of the data clustering program occurs before the clustering begins. Consequently, clustering does not need to be performed iteratively, thus improving clustering program performance in terms of the required processing time and processing resources. The system provides pairs of data records; the user indicates whether or not these data records should belong to the same cluster. The similarity values of the records of the selected pairs are calculated based on the default parameters of the clustering program. From the resulting similarity values, an optimal similarity threshold is determined. When the optimization criterion does not yield a single optimal similarity threshold range, equivalent candidate ranges are selected. To select one of the candidate ranges, pairs of data records having a calculated similarity value within the critical region are offered to the user. In Charpiot, the method employed tunes prior to clustering. Moreover, the invention to Charpiot does not consider event or object attribution.

U.S. Pat. No. 7,536,371 to Hartman et al provides an apparatus for the analysis of a process having parameter-based faults includes: a parameter value inputer configured for inputting values of at least one process parameter, a fault detector, configured for detecting the occurrence of a fault, a learning file creator associated with the parameter value inputer and the fault detector, configured for separating the input values into a first learning file and a second learning file, the first learning file comprising input values from a collection period preceding each of the detected faults, and the second learning file comprising input values being input outside the collection periods, and a learning file analyzer associated with the learning file creator, configured for performing a separate statistical analysis of the first and second learning files, thereby to assess a process status. Overall, the invention in Hartman et al provides more of a data reduction technique that considers combinatorial effects.

U.S. Pat. No. 7,886,134 to Mizumo provides a method combining a loop support mechanism and a branch prediction mechanism. After an instruction execution unit executes an end block instruction of a block repeat, the loop control unit branches to the first instruction in the loop and sends a pseudo branch instruction to the instruction execution unit. The instruction execution unit acts as if the last instruction in the block is an instruction for branching to the start address of the block. This is stored in the branch prediction unit and branch prediction is performed thereafter. The invention in Mizumo basically stores historical information but employs more of a Bayesian approach to doing so.

U.S. Pat. No. 7,882,394 to Hosek et al provides a method for condition monitoring and fault diagnosis that includes a data collection function that acquires time histories of selected variables for one or more of the components, a preprocessing function that calculates specified characteristics of the time histories, an analysis function for evaluating the characteristics to produce one or more hypotheses of a condition of the one or more components, and a reasoning function for determining the condition of the one or more components from the one or more hypotheses. The invention in Hosek essentially provides an intelligent condition-monitoring and fault diagnostic system for predictive maintenance. Hosek's invention is based upon hypothesis testing a "reasoning" component, and bases its diagnostics on energy (both mechanical and electrical) dissipation for each time history and a simplistic model that checks to see if individual operating parameters exceed predefined threshold values.

What the prior art has failed to provide and what is therefore needed, regardless of the method employed, is a method that has the ability to detect process upsets or anomalies soon enough for industrial process operators to react. Methods that employ neural networks and clustering algorithms potentially help operators and analysts deal with some of the challenges in modeling a complex system by incorporating operator knowledge into a model.

OBJECTS AND SUMMARY OF THE INVENTION

It is therefore an object of the present invention to provide a method and apparatus that has the ability to detect process events and objects, including upsets or anomalies, soon enough for industrial process operators to react.

It is a further object of the present invention to provide a method and apparatus for detecting process events and objects that has the ability to minimize the level of false alarm rates while maximizing the level of correct detections.

It is still a further object of the present invention to provide a method and apparatus for detecting process events and objects that has the ability to optimize false alarm rate and maximize correct detections on a per event or per object basis.

Briefly stated, the present invention achieves these and other objects by providing a method and apparatus for object or event of interest detection which minimizes the level of false alarms and maximizes the level of detections as defined on a per event or object basis by the analyst. The invention allows for the minimization of false alarms for objects or events of interest which have a close resemblance to all other objects or events mapped to the same multidimensional feature space, and allows for the per event or per object adjustment on false alarms for objects or events of higher interest.

In a fundamental embodiment of the present invention, method and apparatus for event detection, the invention permits per event adjustment of false alarm rate. The invention loads operational data and background data then compares them to determine whether those data contain predictive data. If so, predictive data is tagged with the time when and where it occurs. Statistical features are extracted and reported and statistical features of choice are selected from that predictive data so as to form at least one feature vector. Patterns formed by the feature vectors are associated according to the character of the predictive data and the time at which it occurred. False alarm thresholds and detection rates for each cluster are optimized. Events are detected and the results are fed back into the process.

Still, according to a fundamental embodiment of the present invention method and apparatus for event detection, the invention associates those patterns formed by the feature vectors by mapping each of the feature vectors in multidimensional feature space, from which clusters of each feature vector are formed into a class of feature vectors corresponding to time stamps which define conditions of interest. The invention then calculates an optimum number of associated patterns based upon the compactness of the clusters. Then, bounds around regions defining the associated patterns are initialized using a multi-objective optimization method, which comprises testing the threshold values of 0 through 100% for each cluster and finding a threshold value for each cluster that results in highest detection rate to false alarm rate ratio. When the overall detection rate is less than a desired minimum, the invention finds a cluster that would produce the greatest difference between a change in the detection rate and change in said false alarm rate if its threshold was increased by 0.05. When found, the threshold increased by 0.05. But when the overall detection rate is greater than a desired minimum, the threshold of each of the clusters with a detection rate of 0, is set to a detection rate of 0.

Yet still, according to a fundamental embodiment of the present invention method and apparatus for event detection, the invention determines whether optimal event detection has been achieved and when optimal event detection has not yet been achieved, the invention associates the operational data with corresponding clusters, adjusts threshold values which bound the clusters based upon event attribution associated with each cluster, and compares results of false alarm rate and correct detection rate with an acceptable false alarm rate on a per cluster basis.

The above and other objects, features, and advantages of the present invention will become apparent from the following description read in conjunction with the accompanying drawings, in which like reference numerals designate the same elements.

REFERENCES

1. Kappen, J. *Modelling and Simulation in the Paper Industry*. s.l.: COST Aciton E36, 2006.
2. Chiang, L., Russell, E., and Braatz, R. *Fault Detection and Diagnosis in Industrial Systems*. Great Britain: Springer-Verlag London Limited, 2001.
3. Basir, O. A., Shen, H. C. Modeling and fusing uncertain multisensory data. *J. Robot Syst.* 1996, Vol. 13, 2, pp. 95-109.
4. Hatzipantellis, E., Murray, A., Penman, J. Comparing Hidden Markov Models with artificial neural networks for condition monitoring applications. *Proc. Artificial Neural Networks*. June 1995, pp. 369-374.
5. Iserman, R. Process fault detection based on modeling and estimation methods. *Automatica*. 1984, Vol. 20, 4, pp. 397-404.
6. Wei, W. *Time Series Analysis Univariant and Multivariant Methods*. Redwood City, Calif.: Addison-Wesley, 1990.
7. Basseville, M., Nikiforov, V. *Detection of Abrupt Changes, Theory and Application*. Englewood Cliffs: Prentice-Hall, 1993.
8. Kim, B., and May, G. S. Real-time diagnosis of semiconductor manufacturing equipment using a hybrid neural network expert system. *IEEE Trans. Com., Packag., Manufact technol. conference*. January 1997, pp. 39-47.
9. Baker, M., himmel, C., and May, G. Time series modeling of reactive ion etching using neural networks. *IEEE Trans. Semiconduct. Manufacturing*. February 1995, Vol. 8, pp. 62-71.
10. Weigend, A., Gershenfeld, N. *Time Series Prediction: Forcasting the Future and Understanding the Past*. Reading, Mass.: Addison-Wesley, 1994.
11. Scott, G. *Knowledge-based artificial neural networks for process modeling and control*. s.l.: The University of Wisconsin, 1993.
12. Hill, T. and Lewicki, P. *Statistics Methods and Applications*. Tulsa, Okla.: StatSoft Inc., 2007.

BRIEF DESCRIPTION OF THE DRAWINGS

FIG. 3 depicts a graphical user interface (GUI) of the present invention where correlation analysis techniques have been performed on the data within a selected time interval, with results displayed.

DETAILED DESCRIPTION OF THE PREFERRED EMBODIMENT

Figure 1:
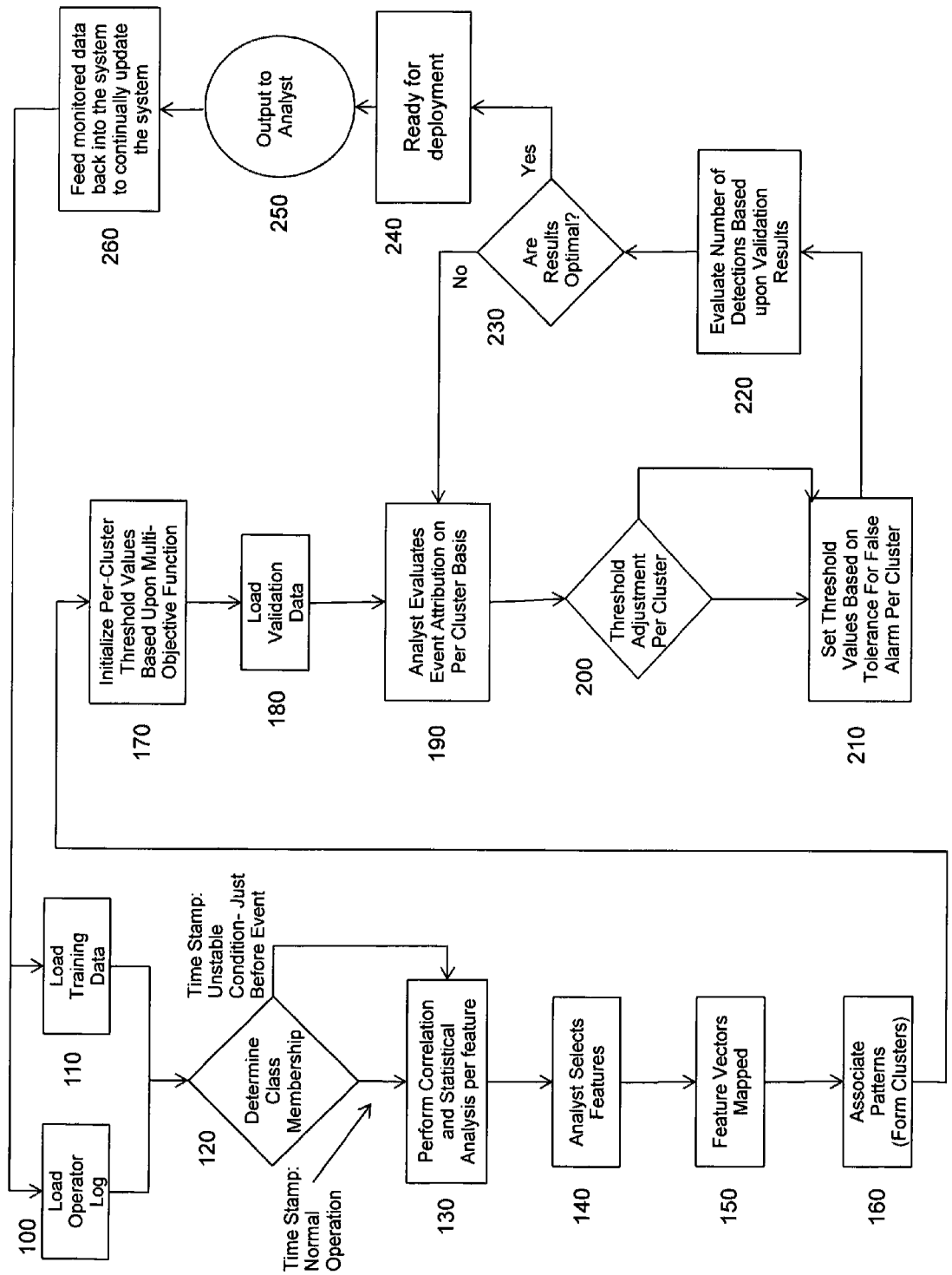
FIG. 1 depicts a flowchart of the process implemented by the present invention.

Referring to FIG. 1, the present invention provides a method for alerting analysts or operators when an event or object of interest is detected. The method uses an innovative approach to minimize false alarm rates by adjusting the bounds around the associated patterns which emerge in a multi-dimensional feature space, and which deviate from either normal process behavior, or deviate from the low interest objects. In addition, the method allows for analyst intervention to uniquely adjust the level of false alarm for high interest events or objects.

Each object or event has data associated with it which makes up the object or events features. The invention's automated correlation analysis helps the analyst decide which features provide the most discriminating information. The features make up feature vectors. Feature vectors associate together through the use of unsupervised learning techniques. These associated patterns form clusters 160 in multi-dimensional feature space. Event or object attribution 190 then becomes associated with the various clusters. Using the invention, the analyst then adjusts the bounds 200 around those clusters in such a way as to maximize desired detections and minimize undesired detections. This method is especially useful when considering disproportionate classes; (i.e., when looking for the "needle in the haystack".)

Features may be either sensor inputs corresponding to a specific event or they may be characteristics corresponding to a specific object. When there are a number of features to be considered and/or massive amounts of data to be processed to discriminate one object or event from another, the present invention employs techniques to discriminate key events or objects so as to detect the object or event in the future. When key objects or events are detected, an analyst or operator monitoring the system can be alerted.

In the present invention, a computer means monitor and industrial-like process or any other system or process which is amenable to being monitored. Sensor measurements are made at various points in the process being monitored and communicated via common computer data channels or media to the computer means. Within the computer a software program executes the appropriate computer-implementable steps so as to assemble the sensor measurements or object parameters into a vector, or feature vector, so the entire vector represents an observation from a multivariate population. When applied to a real world multi-sensor environment, the operation and internal complexity of the process becomes represented in terms of the collection of vectors which describe the different observations, or states, at different points in time. When applied to an object, the features which add the most value to discriminate one set of objects from another become that objects feature vector. A feature vector is an n-dimensional vector of numerical features that come from the various data collection points. The information contained in such feature vector may include (1) well defined (structured) parameters describing an object to be characterized; (2) sensor measurements assembled into a vector, so the entire vector represents an observation from a multivariate population at different points in time.

For the regions of the feature space where significant overlap exist and discrimination between the clusters formed to characterize classes is most difficult, a novel method of selecting and combining event or object specific features is enhanced with analyst feedback into the training of the models.

The present invention provides a method which is both a class discrimination and pattern matching tool in which the analyst/operator/engineer can manually tune each cluster and adjust the thresholds 200 around the clusters which characterize various objects or events of interest.

With this method, several clusters are formed 160 for classes representing normalcy and several clusters are formed which represent anomalous events. (Note: the clusters may also represent different classes of objects). Each class contains its own set of models.

The tuning of the models is done by adjusting the threshold values 200 on a per cluster basis to accommodate the tolerance level the analyst may have for false alarms verses the cost benefit from early detection for each event. In order to understand what information the various clusters represented, the events from the operator/analyst historical records are mapped to the clusters which were defined by event indicator vectors. This is used both to help the analyst tune the clusters associated with objects and events of interest and when the program is deployed, this information will be used to provide feedback 260 along with the alert when and object of interest or event of interest is detected.

The present invention's method for implementing the Cluster Tuning Algorithm (CTA) is described as follows. The user loads the data files. 100, 110 For the case of an industrial application of the present invention, this data file would be a file which reports sensor readings for various locations in the industrial process in a continuous operation at regular time increments, or training data 110. The associated operator logs which correspond to the same duration of time also must be loaded 100. For the case of object detection application of the present invention, features associated with objects and their corresponding object designation must be loaded 100.

All records from a designated training set, both the feature vectors associated with the periods of normalcy and the periods of instability, are mapped 150 in multidimensional feature space. In the case of detection of objects of interest, all objects and their associated features are mapped 150.

Associated patterns, or clusters, are formed 160 from the training data set. For the purpose of industrial event prediction, associated patterns are calculated based upon the historical feature vectors which correspond to times of process instability. However, all feature vectors are mapped 150 in the same multidimensional space. For object detection, the feature vectors associated with the objects of interest are used for pattern association 160, although all feature vectors are mapped 150 in the multi-dimensional feature space.

The initialization of the threshold bounds 170 is done with a multi-objective function which maximizes the number of associated vectors which would yield correct detections and minimizes the number of associated vectors which would yield a false alarm 220, 230.

The operator logs associate events, or historical attribution of objects of interest, to their corresponding clusters.

Figure 2:
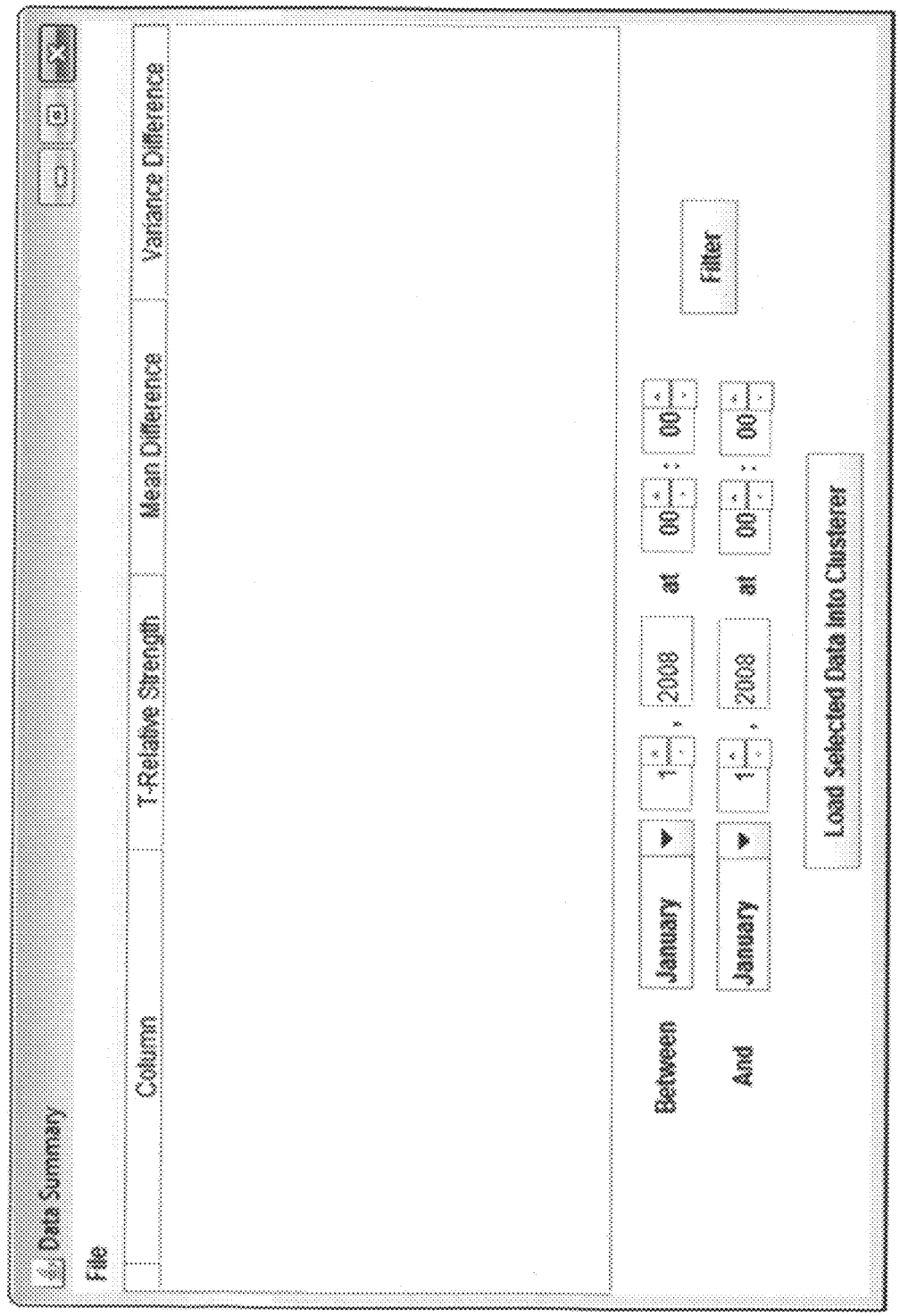
FIG. 2 depicts a graphical user interface (GUI) of the present invention into which data may be loaded.

Referring to FIG. 1 and FIG. 2, the present invention provides an analyst with information about either historical object attribution or historical event attribution through a graphical user interface. The invention presents the analyst with the option to adjust the bounds surrounding each cluster so that they may allow for a higher level of false alarms for events or objects of interest. The detection of these associated events or objects are of more importance. The analyst tolerance for false alarm would be higher because of the higher reward for positive detection.

The present invention is unique and novel because it provides a method that 1) allows for the minimization of false alarms for objects or events of interest which have a close resemblance to all other objects or events mapped to the same multidimensional feature space; and 2) allows for the per event or per object adjustment on false alarms for objects or events of higher interest.

Data Preprocessing

Still referring to FIG. 1, the first step in this method is the data pre-processing step. An example of how the data could be loaded and a graphical user interface displayed, is shown. The analyst will load the data file and select the interval of time which will serve as the training data set. It is of vital importance that the analyst uses a correlation analysis technique to determine which features, or sensors, to use to create the feature vectors which will be mapped into the multidimensional feature space.

The data file should contain all of the data that the user wishes to use to train, and validate the present invention's performance. For demonstration purposes, test data should also be loaded to simulate the deployment of the invention. The following description is provided for specific file formats. However, only minor adjustment to the read file would be needed for other file formats used with the present invention. In this example, the user selects a .csv (Comma Separated Variable) file that is formatted correctly. For this application, a correctly formatted file must be configured in a way that is consistent with the read format specified in the read file. In the example shown, there are two lines of column headers, and each line thereafter containing a single data entry. The first value in both lines of headers should be "DATE", and the final column should contain no headers. The headers of the columns in between represent the names of different sensors. The first value in each data entry must be the entry's date/time in the format "dd-MMM-yy HH:mm:ss.000". For example, Jan. 18, 2008 at 1:55 p.m. would look like "18-Jan-08 13:55: 00.000". The last value for each data entry should be either a "1" or a "0". A "1" implies that the system was in a healthy state at that time, and a "0" implies that the system was in an unhealthy state and about to fail. The values in between represent the readings for each sensor at that time.

Correlation Analysis Table

Referring to FIG. 2, a properly formatted file is loaded, and the data preprocessing screen will look similar to that depicted. Various correlation analysis techniques may be performed on the data that falls within the selected time interval, and the results may be displayed in a graphical user interface (GUI) like the one depicted. Each row in the table represents a column (or particular sensor) from the original data set. The first value in the row is the name of the sensor, which is taken from the first line of headers in the original data file. The next three values are the T-relative strength, mean difference, and variance difference for the data from that sensor. Each column in the table can be sorted by clicking on the column header.

T-Relative Strength

The present invention determines the T-Relative strength by performing the Tukey Test (t-test). The data from the sensor is broken into two classes, values from records indicating a healthy system and values from records indicating an unhealthy system. The Tukey test is essentially a measure of the overlap between the two classes. A large T-relative strength value implies little overlap while a small T-relative strength value implies a large amount of overlap. The value is calculated by first determining the minimum and maximum values for each class. Then, the numbers of values in the class which contains the overall maximum that are greater than the maximum of the other class are counted. This number is added to the number of values from the class which contains the overall minimum that is less than the minimum value of the other class. The result is the T-relative strength. Sensors which have a large T-relative strength value are generally more useful when creating clusters.

Mean Difference

The present invention determines the mean difference of a sensor by calculating the averages of the values for each class, and then finding the absolute value of the difference between the two averages. Assuming the data set has been normalized, a large mean difference could imply a large separation between the two classes, making that sensor more useful when clustering.

Variance Difference

The present invention determines the variance difference of a sensor by calculating the variances of the values for each class, and then finding the absolute value of the difference between the two variances.

Selecting Fields

Still referring to FIG. 2, the present invention permits the user to use the correlation analysis results to select which sensors they wish to consider data from when creating clusters. A user may have a reason to select a feature which is not historically statistically significant. In this example, a feature can be selected by clicking on the corresponding checkbox on the left side of the table. Once the user has selected which features they wish to use, the method moves to the pattern association step.

Clustering/Threshold Adjustment

The present invention associates the designated feature vectors into their clusters and evaluates/optimizes the thresholds. After the bounds surrounding the clusters have been initialized, the threshold values which define the bounds for each of the clusters are optimized (see FIG. 1, 220, 230). To do this, first, the invention assigns each data entry from the validation set to the nearest cluster. The validation set consists of data from the file initially loaded in the data preprocessing screen. The thresholds for each cluster are then dynamically optimized (see FIG. 1, 220, 230) in an attempt to maximize the detection rate to false alarm rate ratio while also meeting the selected minimum detection rate 210. The detection rate is the percentage of fault indicating entries in the validation set that are correctly classified as fault-indicating (fall within their cluster's threshold). The false alarm rate is the percentage of non-fault indicating records in the validation set which are incorrectly classified as fault-indicating.

Event Attribution

At this stage of the process, the invention allows the user or analyst to view the report of events associated with the various patterns which have formed. Since more than one event may be associated with a given cluster, this report may be most useful if it is given as a breakdown of percentage of associated events with each cluster.

The detection rate is the percentage of correct detections in the validation set that are correctly classified as detections. The present invention features a desired detection slider which allows the user to select the minimum detection rate on a per cluster basis. At this point the present invention would now be configured so that an analyst or operator can evaluate future events or objects of interest.

What is claimed is:

1. A method for event detection permitting per event adjustment of false alarm rate, comprising the steps of:
   loading operational data;
   loading background data;
   comparing said operational data to said background data;
   determining from said step of comparing, whether said operational data contains predictive data;
   tagging predictive data at the time when and where it occurs;
   extracting and reporting statistical features from said predictive data;
   selecting said statistical features of choice so as to form at least one feature vector;
   associating into a plurality of clusters, patterns formed by said at least one feature vector according to the character of said predictive data and said time at which it occurred;
   optimizing false alarm thresholds and detection rates for each of said plurality of clusters;
   detecting events; and
   feeding back results.

2. The method of claim 1, wherein said step of associating further comprises the steps of:
   mapping each of said at least one feature vector in multi-dimensional feature space;
   forming clusters of each of said at least one feature vector into a class of feature vectors corresponding to time stamps which define conditions of interest;
   calculating an optimum number of associated patterns based upon the compactness of said clusters;

initialize bounds around regions defining said associated patterns using multi-objective optimization method, comprising the steps of:
  testing threshold values of 0 through 100% for each said cluster;
  finding a threshold value for each said cluster that results in highest detection rate to false alarm rate ratio;
  WHEN the overall said detection rate is less than a desired minimum;
    finding a cluster that would produce the greatest difference between a change in said detection rate and change in said false alarm rate if its threshold was increased by 0.05; and
    increasing said threshold by 0.05;
  OTHERWISE, setting said threshold of each of said clusters with a detection rate of 0, to 0.

3. Method of claim 2, wherein said step of detecting events further comprises the steps of:
  loading validation data; and
  optimizing event detection.

4. The method of claim 3, wherein said step of optimizing event detection further comprises the steps of:
  determining whether optimal event detection has been achieved;
  WHEN optimal event detection has not yet been achieved
    associating said operational data with corresponding said clusters;
    adjusting threshold values which bound the clusters based upon event attribution associated with each cluster; and
    comparing results of false alarm rate and correct detection rate with an acceptable false alarm rate on a per cluster basis;
  OTHERWISE, returning to said step of detecting events.

5. The method of claim 1 wherein, when said event detection comprises industrial process event detection,
  said operational data comprises operator logs;
  said background data comprises training data; and
  said predictive data comprises indicators of unstable process events.

6. The method of claim 1 wherein, when said event detection comprises object detection,
  said operational data comprises object data;
  said background data comprises attribution data; and
  said predictive data comprises indicators of objects of interest.

7. Method of claim 1, wherein said step of selecting said statistical features further comprises the steps of:
  extracting statistical features;
  performing correlation analysis using statistical T-Test so as to compare on a feature-to-feature basis said statistical features which provide the most class discrimination value;
  determining quantity of outlying features on a per feature basis;
  performing statistical analysis on a per feature basis between the two classes; and
  reporting via graphical user interface, the results of above analysis to an analyst.

8. An apparatus for detecting process events, comprising
  a computer;
  a software program; and
  a means for communicating inputs and outputs to and from said computer and said process; wherein
    said software program further comprises a set of computer-implementable instructions stored on a non-transitory media, which, when executed by said computer cause said computer to perform the following steps:
      loading operational data;
      loading background data;
      comparing said operational data to said background data;
      determining from said step of comparing, whether said operational data contains predictive data;
      tagging predictive data at the time when and where it occurs;
      extracting and reporting statistical features from said predictive data;
      selecting said statistical features of choice so as to form at least one feature vector;
      associating into a plurality of clusters, patterns formed by said at least one feature vector according to the character of said predictive data and said time at which it occurred;
      optimizing false alarm thresholds and detection rates for each of said plurality of clusters;
      detecting events; and
      feeding back results.

9. The apparatus of claim 8, wherein said step of associating further comprises the steps of:
  mapping each of said at least one feature vector in multi-dimensional feature space;
  forming clusters of each of said at least one feature vector into a class of feature vectors corresponding to time stamps which define conditions of interest;
  calculating an optimum number of associated patterns based upon the compactness of said clusters;
  initialize bounds around regions defining said associated patterns using multi-objective optimization method, comprising the steps of:
    testing threshold values of 0 through 100% for each said cluster;
    finding a threshold value for each said cluster that results in highest detection rate to false alarm rate ratio;
    WHEN the overall said detection rate is less than a desired minimum;
      finding a cluster that would produce the greatest difference between a change in said detection rate and—change in said false alarm rate if its threshold was increased by 0.05; and
      increasing said threshold by 0.05;
  OTHERWISE, setting said threshold of each of said clusters with a detection rate of 0, to 0.

10. The apparatus of claim 9, wherein said step of detecting events further comprises the steps of:
  loading validation data; and
  optimizing event detection.

11. The apparatus of claim 10, wherein said step of optimizing event detection further comprises the steps of:
  determining whether optimal event detection has been achieved;
  WHEN optimal event detection has not yet been achieved
    associating said operational data with corresponding said clusters;
    adjusting threshold values which bound the clusters based upon event attribution associated with each cluster; and
    comparing results of false alarm rate and correct detection rate with an acceptable false alarm rate on a per cluster basis;
  OTHERWISE, returning to said step of detecting events.

12. The apparatus of claim 8 wherein, when said event detection comprises industrial process event detection,
  said operational data comprises operator logs;
  said background data comprises training data; and
  said predictive data comprises indicators of unstable process events.

13. The apparatus of claim 8 wherein, when said event detection comprises object detection,
  said operational data comprises object data;
  said background data comprises attribution data; and
  said predictive data comprises indicators of objects of interest.

14. The apparatus of claim 8, wherein said step of selecting said statistical features further comprises the steps of:
  extracting statistical features;
  performing correlation analysis using statistical T-Test so as to compare on a feature-to-feature basis said statistical features which provide the most class discrimination value;
  determining quantity of outlying features on a per feature basis;
  performing statistical analysis on a per feature basis between the two classes; and
  reporting via said computer's graphical user interface, the results of above analysis to an analyst.

* * * * *